United States Patent [19]

Kuroda et al.

[11] Patent Number: 5,191,762
[45] Date of Patent: Mar. 9, 1993

[54] SYSTEM FOR DETECTING DETERIORATION OF A THREE-WAY CATALYST OF AN INTERNAL COMBUSTION ENGINE

[75] Inventors: Shigetaka Kuroda; Hiroshi Ono, both of Wako, Japan

[73] Assignee: Honda Giken Kogyo K.K., Tokyo, Japan

[21] Appl. No.: 700,542

[22] Filed: May 15, 1991

[30] Foreign Application Priority Data

May 30, 1990 [JP]  Japan .............................. 2-056617[U]

[51] Int. Cl.$^5$ ................................................. F01N 3/28
[52] U.S. Cl. .......................................... 60/276; 60/277
[58] Field of Search ......................... 60/274, 276, 277

[56] References Cited

U.S. PATENT DOCUMENTS

| | | | |
|---|---|---|---|
| 3,939,654 | 2/1976 | Creps | 60/276 |
| 3,969,932 | 7/1976 | Rieger | 60/277 |
| 4,251,989 | 2/1981 | Norimatsu | 60/276 |
| 4,622,809 | 11/1986 | Abthoff | 60/274 |
| 5,018,348 | 5/1991 | Durschmidt | 60/277 |

Primary Examiner—Douglas Hart
Attorney, Agent, or Firm—Arthur L. Lessler

[57] ABSTRACT

A system for detecting deterioration of a three-way catalyst of an internal combustion engine. Cutting-off of the fuel supply to the engine is started when the engine is decelerated with the throttle valve substantially fully closed, and the fuel supply to the engine is resumed when the rotational speed of the engine has become lower than a predetermined value. Time is measured which output from the air-fuel ratio sensor has required to reach a predetermined reference value after the resumption of the fuel supply to the engine. It is determined that the three-way catalyst is deteriorated when the time measured is shorter than a predetermined time period.

6 Claims, 4 Drawing Sheets

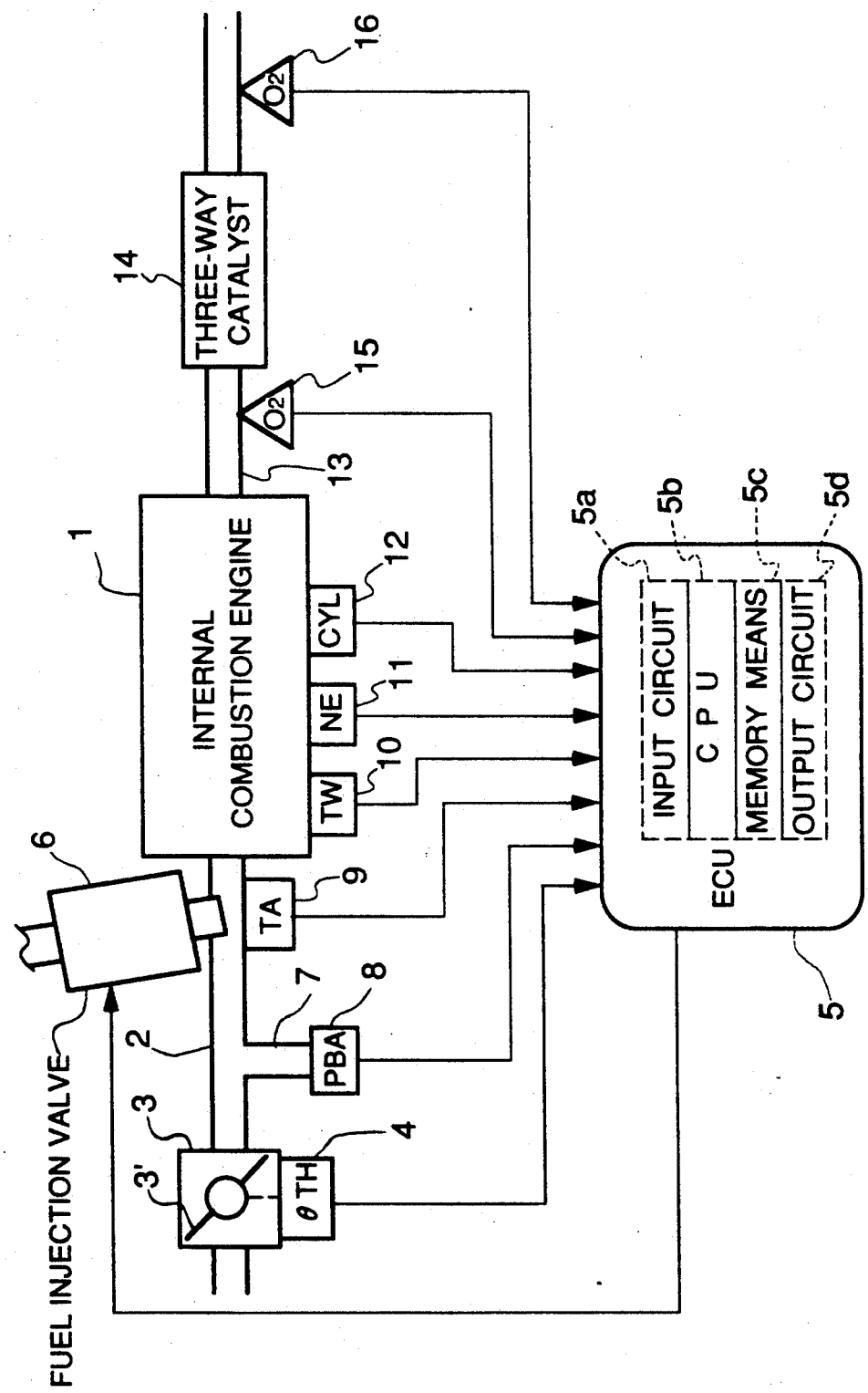

SYSTEM FOR DETECTING DETERIORATION OF A THREE-WAY CATALYST OF AN INTERNAL COMBUSTION ENGINE

BACKGROUND OF THE INVENTION

This invention relates to a system for detecting deterioration of a three-way catalyst arranged in an exhaust system of an internal combustion engine, based on output from an air-fuel ratio sensor arranged in the exhaust system at a location downstream of the three-way catalyst.

In general, in an internal combustion engine having a three-way catalyst arranged in the exhaust system thereof, when the engine undergoes transition from an open-loop control region in which the fuel supply to the engine is cut off as shown in FIG. 3 or an air-fuel mixture supplied to the engine is controlled to a lean state to a feedback control region in which the air-fuel ratio of the mixture is controlled to a theoretical value in a feedback manner, a post-catalyst air-fuel ratio sensor arranged in the exhaust system at a location downstream of the three-way catalyst continuously generates an output indicative of a lean air-fuel ratio over a predetermined time period after the above transition, due to oxygen storage effect which the three-way catalyst has, in spite of the fact that exhaust gases resulting from an air-fuel mixture having a nearly theoretical air-fuel ratio which is no longer lean start to be supplied to the three-way catalyst. Furthermore, the three-way catalyst has such a nature that the predetermined time period becomes shorter as the deterioration of the three-way catalyst advances.

In view of the above phenomenon and the nature of the three-way catalyst, systems have conventionally been proposed by Japanese Patent Publications (Kokai's) Nos. 1-203633, 1-211634, and 1-257738, in which a predetermined delaying time period for delaying the start of the feedback control based on the output from the post-catalyst air-fuel ratio sensor is provided after termination of the open-loop control, and at the same time the predetermined delaying time period is shortened as the deterioration of the three-way catalyst advances.

According to the above proposed systems, the degree of deterioration of the three-way catalyst is estimated based on total time over which the engine was in normal operating conditions, the number times of starting the engine, the travel distance of the vehicle, the difference between the maximum value and minimum value of output values from the post-catalyst air-fuel ratio sensor, the ratio between the period of an output signal from the post-catalyst air-fuel ratio sensor and the period of an output signal from a pre-catalyst air fuel ratio sensor arranged at a location upstream of the catalyst.

However, the detection of deterioration of the three-way catalyst in the above conventional systems is thus carried out in such an indirect manner, dependent on the estimated aging of the three-way catalyst, that it is impossible to accurately detect deterioration of the three-way catalyst.

SUMMARY OF THE INVENTION

It is the object of the invention to provide a system for detecting deterioration of a three-way catalyst of an internal combustion engine, which enables to detect deterioration of the three-way catalyst more accurately.

To attain the above object, the present invention provides a system for detecting deterioration of a three-way catalyst of an internal combustion engine having an intake passage, a throttle valve arranged in the intake passage, an exhaust passage, the three-way catalyst being arranged in the exhaust passage, and an air-fuel ratio sensor arranged in the exhaust passage at a location downstream of the three-way catalyst for detecting the air-fuel ratio of an air-fuel mixture supplied to the engine.

The system according to the invention is characterized by comprising fuel supply control means for starting to cut off the fuel supply to the engine when the engine is decelerated with the throttle valve substantially fully closed, and resuming the fuel supply to the engine when the rotational speed of the engine has become lower than a predetermined value, time-measuring means for measuring time which output from the air-fuel ratio sensor has required to reach a predetermined reference value after the resumption of the fuel supply to the engine by the fuel supply control means, and deterioration-determining means for determining that the three-way catalyst is deteriorated when the time measured is shorter than a predetermined time period.

Preferably, the resumption of the fuel supply to the engine by the fuel supply control means comprises resuming feedback control in which the air-fuel ratio of a mixture supplied to the engine is controlled to a predetermined value in response to concentration of oxygen present in exhaust gases emitted from the engine.

Preferably, the deterioration-determining means includes counting means for counting the number of times of determination of deterioration of the three-way catalyst, the deterioration-determining means finally determining that the three-way catalyst is deteriorated when the counting means has counted a predetermined value.

Also preferably, the measuring of time which the output from the air-fuel ratio sensor has required to reach the predetermined reference value is carried out when a temperature of the engine is higher than a predetermined value.

Also preferably, the measuring of time which the output from the air-fuel ratio sensor has required to reach the predetermined reference value is carried out after a predetermined time period has elapsed after transition of the engine from starting mode to normal mode.

More preferably, the feedback control is carried out by the use of a correction value set in response to the concentration of oxygen present in exhaust gases emitted from the engine, and the measuring of time which the output from the air-fuel ratio sensor has required to reach the predetermined reference value is carried out when the feedback control is resumed with the correction value set to a richer initial value.

The above and other objects, features, and advantages of the invention will become more apparent from the ensuing detailed description taken in conjunction with the accompanying drawings.

BRIEF DESCRIPTION OF THE DRAWINGS

FIG. 1 is a schematic view of the whole arrangement of a fuel supply control system of an internal combustion engine including a system for detecting deterioration of a three-way catalyst;

DETAILED DESCRIPTION

Figure 2A:
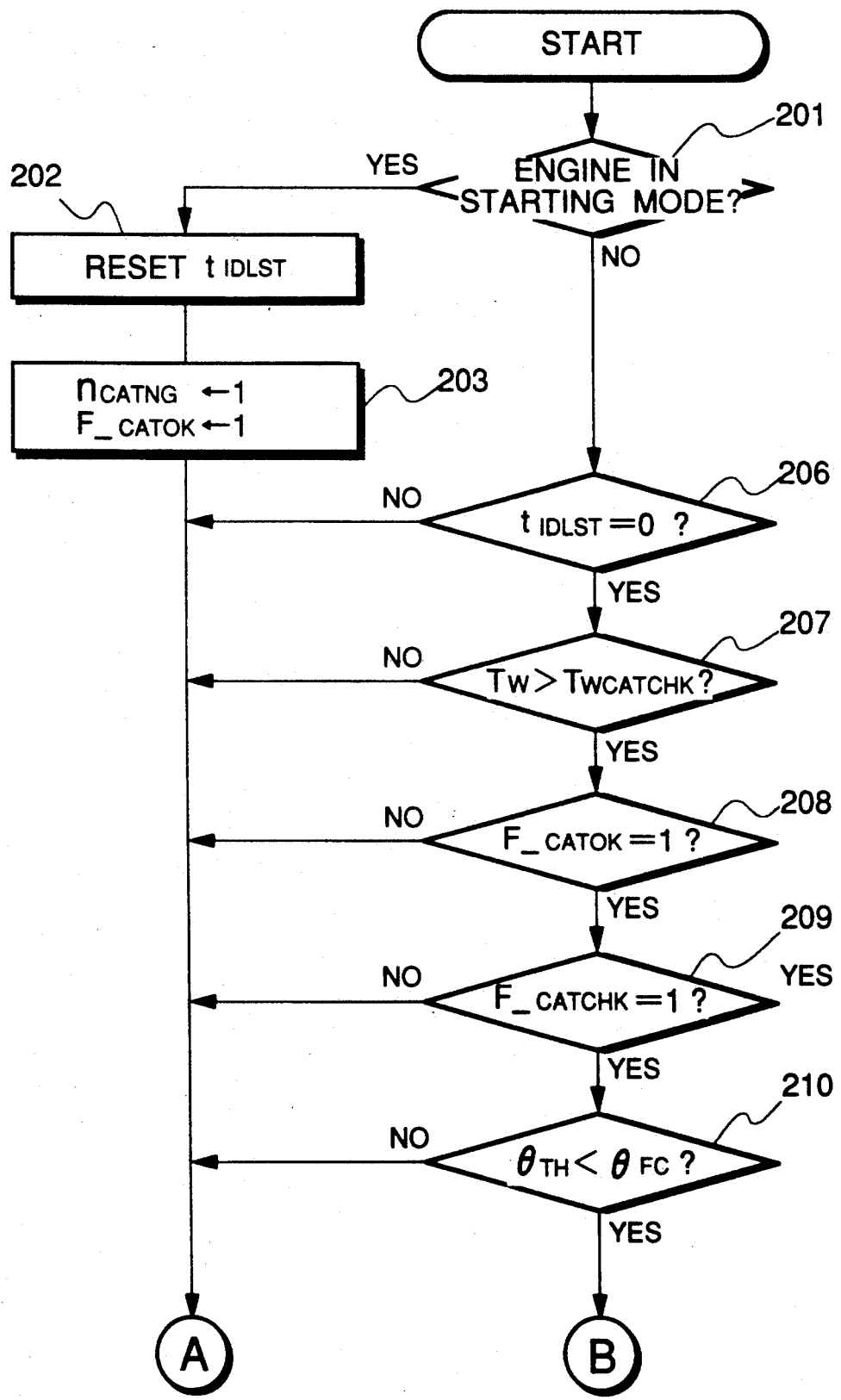
FIGS. 2a and 2b are parts of a flowchart of a program for detection of deterioration of the three-way catalyst executed by CPU 5b appearing in FIG. 1.

The invention will now be described in detail with reference to the drawings showing an embodiment thereof.

Referring first to FIG. 1, there is shown the whole arrangement of a fuel supply control system for an internal combustion engine including a system according to the invention for detecting deterioration of a three-way catalyst. In the figure, reference numeral 1 designates a four-cylinder type internal combustion engine for automotive vehicles. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_A$) sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5. The ECU 5 calculates the engine rotational speed Ne based on the time intervals between TDC signal pulses.

A three-way catalyst 14 is arranged within an exhaust pipe 13 connected to the cylinder block of the engine 1 for purifying noxious components such as HC, CO, and NOx. O₂ sensors (a pre-catalyst O₂ sensor and a post-catalyst O₂ sensor) 15, 16 as air-fuel ratio sensors are mounted in the exhaust pipe 13 at locations upstream and downstream of the three-way catalyst 14, respectively, for sensing the concentration of oxygen present in exhaust gases emitted from the engine 1, which corresponds to the air-fuel ratio of an air-fuel mixture supplied to the engine 1, and supplying electric signals in accordance with the output values thereof to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6.

The CPU 5b operates in response to the above-mentioned signals from the sensors to determine operating conditions in which the engine 1 is operating, such as an air-fuel ratio feedback control region in which the fuel supply is controlled in response to the detected oxygen concentration in the exhaust gases, and open-loop control regions including a fuel cut region, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5.

$$T_{OUT} = T_i \times K_1 \times K_{O2} + K_2 \quad (1)$$

where $T_i$ represents a basic value of the fuel injection period $T_{OUT}$ of the fuel injection valves 6, which is read from a Ti map set in accordance with the engine rotational speed Ne and the intake pipe absolute pressure $P_{BA}$.

$K_{O2}$ is an air-fuel ratio feedback control correction coefficient whose value is determined in response to the oxygen concentration in the exhaust gases detected by the O₂ sensors 15, 16, during feedback control, while it is set to respective predetermined appropriate values while the engine is in predetermined operating regions (the open-loop control regions) other than the feedback control region. In addition, the method of setting the value of the correction coefficient $K_{O2}$ based on the output voltage from an O₂ sensor is described in detail e.g. in Japanese Provisional Patent Publication (Kokai) No. 63-189638, referred to hereinbefore.

$K_1$ and $k_2$ are other correction coefficients and correction variables, respectively, which are calculated based on various engine parameter signals to such values as to optimize characteristics of the engine such as fuel consumption and accelerabitlity depending on operating conditions of the engine.

The CPU 5b supplies through the output circuit 5d, the fuel injection valves 6 with driving signals corresponding to the calculated fuel injection period $T_{OUT}$ determined as above, over which the fuel injection valves are opened.

Figure 2B:
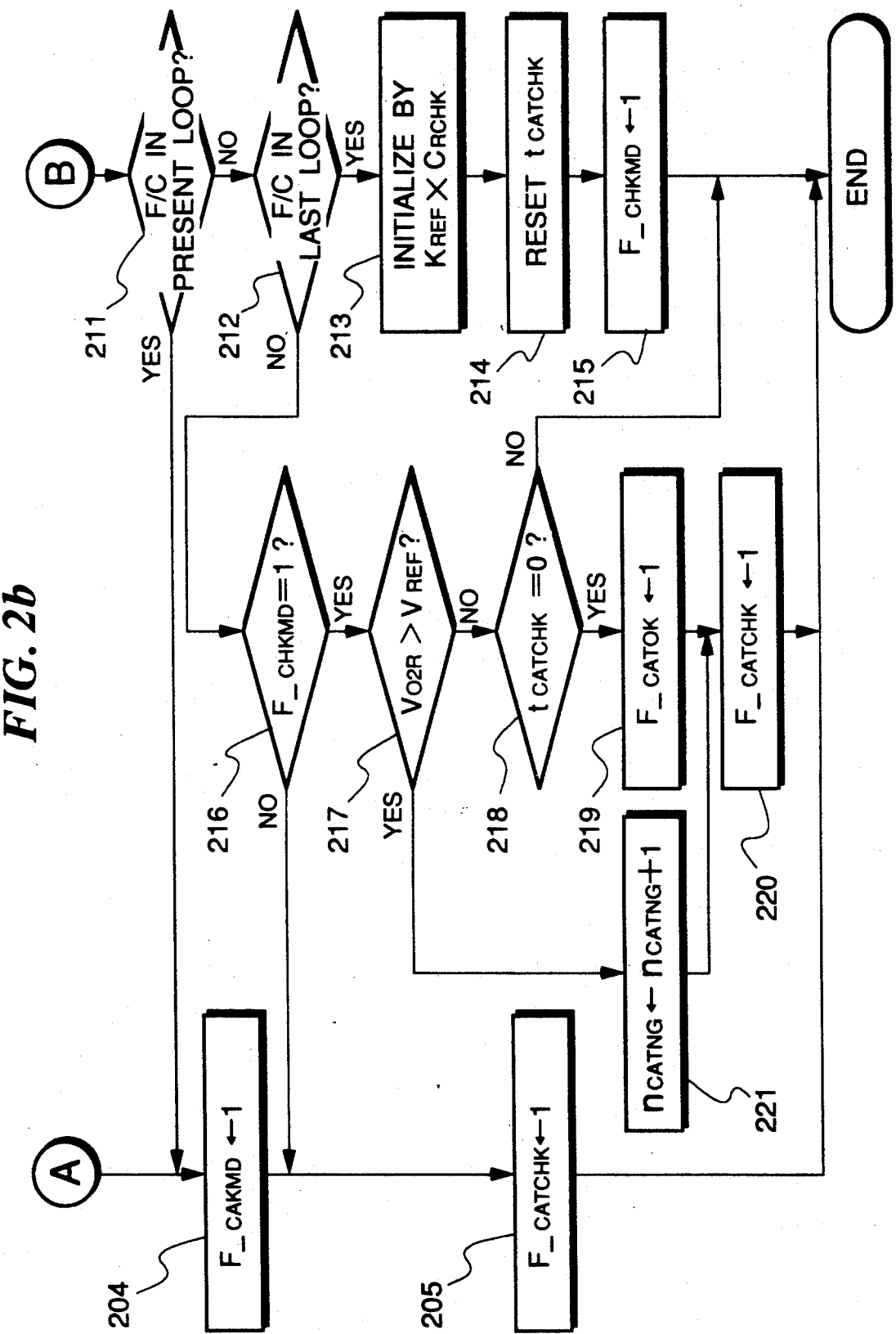

The manner of detection of deterioration of the three-way catalyst 14 executed by the CPU 5b in the thus constructed fuel supply control system will now be described in detail with reference to a program shown in FIGS. 2a and 2b. This program is carried out upon generation of each TDC signal pulse.

First, at a step 201, it is determined whether or not the engine 1 is operating in starting mode. If the answer to this question is affirmative (Yes), a $t_{IDLST}$ timer formed of a down counter is set to a predetermined time period $t_{IDLST}$ (e.g. 1 second) for measuring time elapsed after transition of the engine 1 from the starting mode to normal operation mode (step 202), and an NG count value $n_{CATNG}$ for indicating the number of times of detection of deterioration of the three-way catalyst 14 and a flag $F_{-CATOK}$ for indicating when assuming a value of 1 that the three-way catalyst 14 is normal are each initialized to 0 (step 203). Further, a flag $F_{-CHKMD}$ for indicating when assuming a value of 1 that deterioration of the three-way catalyst 14 is being checked is initialized to 0 at a step 204, and a flag $F_{-CATCHK}$ for indicating when assuming a value of 1 completion of checking of deterioration of the three-way catalyst 14 carried out whenever the engine resumes the feedback control after execution of fuel cut is initialized to 0.

On the other hand, if the answer to the question of the step 201 is negative (No), it is determined at a step 206 whether or not the count value of the $t_{IDLST}$ timer is equal to 0. If the answer to this question is negative (No), it is judged that the engine is not in an operating condition suitable for detection of deterioration of the three-way catalyst 14, and then the program proceeds to the step 204, whereas if the answer is affirmative (Yes), i.e. if the predetermined time period $t_{IDLST}$ has elapsed after transition of the engine 1 to the normal operation mode, the program proceeds to a step 207.

At the step 207, it is determined whether or not the engine coolant temperature $T_W$ is higher than a predetermined value $T_{WCATCHK}$ (e.g. 70° C.). If the answer to this question is negative (No), it is judged that the engine is not in an operating condition suitable for detection of deterioration of the three-way catalyst 14, and then the program proceeds to the step 204, whereas if the answer is affirmative (Yes), the program proceeds to a step 208.

At the step 208, it is determined whether or not the flag $F_{-CATOK}$ is equal to 0. If the answer to this question is negative (No), i.e. if the flag $F_{-CATOK}$ has been set to 1 at a step 219, referred to hereinafter, since it has been determined that the three-way catalyst 14 is normal, the program proceeds through the steps 204 and 205, followed by termination thereof, whereby checking of deterioration of the three-way catalyst 14 at steps 209 et seq. is not carried out until the engine 1 again enters the normal operation mode through the starting mode.

On the other hand, if the answer to the question of the step 208 is affirmative (Yes), the program proceeds to a step 209, where it is determined whether or not the flag $F_{-CATCHK}$ is equal to 0. If the answer to this question is negative (No), i.e. if the flag $F_{-CATCHK}$ has been set to 1 at a step 220, referred to hereinafter, since there has been completed checking of deterioration of the three-way catalyst, which is carried out whenever the engine resumes the feedback control after fuel cut (except the case where the answer to the question of the step 208 is negative), the steps 204 and 205 are carried out for providing for checking of deterioration of the three-way catalyst 14 when the engine resumes the feedback control after fuel cut next time.

On the other hand, if the answer to the question of the step 209 is affirmative (Yes), the program proceeds to a step 210, where it is determined whether or not the throttle valve opening $\theta_{TH}$ is smaller than a predetermined value $\theta_{FC}$ corresponding to a substantially fully closed position of the throttle valve 3'. If the answer to this question is negative (No), it is judged that the engine is not in an operating condition suitable for detection of deterioration of the three-way catalyst 14, and then the program proceeds to the step 204, whereas if the answer is affirmative (Yes), i.e. if the throttle valve 3' is substantially fully closed, the program proceeds to steps 211, 212.

At the step 211, it is determined whether or not the engine is being subjected to fuel cut operation in the present loop, and at the step 212 it is determined whether or not the engine was subjected to fuel cut operation in the immediately preceding loop. This fuel cut operation is carried out by a control program other than the present program in the following manner: Cutting-off of the fuel supply to the engine 1 is started when the engine rotational speed Ne is higher than a first predetermined value (e.g. 3,000 rpm) during deceleration of the engine with its throttle valve 3' in the substantially fully closed position, and is stopped to resume the fuel supply to the engine 1 when the engine rotational speed Ne reaches a second predetermined value (e.g. 1,000 rpm) lower than the first predetermined value.

If the engine is being subjected to fuel cut operation in the present loop (the answer to the question of the step 211 is affirmative), it is judged that it is premature to carry out detection of deterioration of the three-way catalyst 14, and then the program proceeds to the step 204. If the engine was subjected to the fuel cut operation in the immediately preceding loop, and has resumed the feedback control in the present loop (the answer to the question of the step 211 is negative and the answer to the question of the step 212 is affirmative), the program proceeds to a step 213, where initialization of the correction coefficient $K_{O2}$ is effected for detection of deterioration of the three-way catalyst 14. If the engine neither was subjected to the fuel cut operation in the immediately preceding loop nor is being subjected to same in the present loop, the program proceeds to a step 216.

At the step 213, upon starting of the air-fuel ratio feedback control, an initial value of the correction coefficient $K_{O2}$ is set to $K_{REF} \times C_{RCHK}$. $K_{REF}$ represents an average value of the correction coefficient $K_{O2}$ obtained during the feedback control up to this time, and $C_{RCHK}$ a coefficient (e.g. 1.2) for multiplying the average value $K_{REF}$ in consideration of leaning of the air-fuel mixture due to attachment of fuel to the inner wall of the exhaust pipe, which occurs immediately after the engine has returned from the fuel cut operation to the feedback control.

Then at a step 214, a $t_{CATCHK}$ timer formed of a down counter is set to a predetermined time period (4 seconds) for measuring time corresponding to an oxygen storage amount (an amount of oxygen stored) in the three-way catalyst 14. At the following step 215, the aforementioned flag $F_{-CHKMD}$ is set to 1 to thereby indicate that the initialization of the correction coefficient $K_{O2}$ for detection of deterioration of the three-way catalyst 14 has been effected, and checking of deterioration of same is being carried out, followed by terminating the present program.

At the step 216, it is determined whether or not the flag $F_{-CHKMD}$ is equal to 1. If the answer to this question is negative (No), it is judged that the system is not ready for detection of deterioration of the three-way catalyst, and then the program proceeds to the step 205, whereas if the answer is affirmative (Yes), i.e. if it is immediately after the engine has returned from the fuel cut operation to the feedback control, and at the same time the initialization of the correction coefficient $K_{O2}$ for checking of deterioration of the three-way catalyst 14 has been effected, the program proceeds to a step 217, where it is determined whether or not an output value $V_{O2R}$ from the post-catalyst $O_2$ sensor 16 is higher than a predetermined reference value $V_{REF}$ (e.g. 0.45 V) which corresponds to a desired on target air fuel ratio, e.g. a theoretical value, to which the mixture is controlled during feedback control. Then the program proceeds to a step 218, where it is determined whether or not the count value of the $t_{CATCHK}$ timer is equal to 0.

Figure 3:
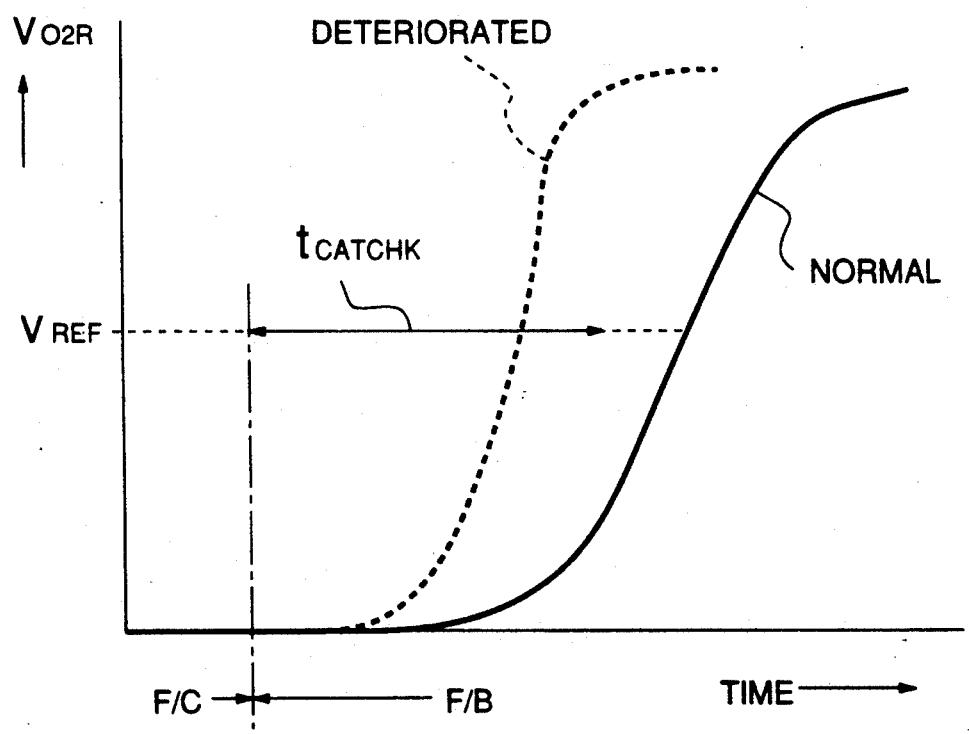
FIG. 3 is a graph depicting changes in output from a post-catalyst O₂ sensor.

If both of the answers to the questions of the steps 217 and 218 are negative, the present program is terminated, whereas, as shown in FIG. 3, if the output value $V_{O2R}$ from the post-catalyst $O_2$ sensor 16 has reached the predetermined reference value $V_{REF}$ before the predetermined time period $t_{CATCHK}$ elapses (the answer to the question of the step 217 is affirmative), it is judged that the three-way catalyst 14 is deteriorated, and then the NG count value $\eta_{CATNG}$ is incremented at a step 221, followed by the program proceeding to the step 220. If the output value $V_{O2R}$ from the post-catalyst $O_2$ sensor has not reached the predetermined reference value $V_{REF}$ before the predetermined time period $t_{CATCHK}$ elapses (the answer to the question of the step 217 is negative and at the same time the answer to the question of the step 218 is affirmative), it is judged that the three-way catalyst 14 is not deteriorated but functioning normally, and then the flag $F\_{CATOK}$ is set to 1 at a step 219, and at the step 220, the flag $F\_{CATCHK}$ is set to 1 to thereby indicate completion of checking of deterioration of the three-way catalyst 14, followed by terminating the present program.

In a control program other than the present program, the NG count value $\eta_{CATNG}$ is monitored, and when it reaches a predetermined value (e.g. 3), it is finally judged that the three-way catalyst 14 is deteriorated, and then the driver may be warned of the fact, for example.

In the embodiment described above, checking of deterioration of the three-way catalyst is carried out when the engine has resumed the feedback control after the fuel cut operation. However, this is not limitative, but the present invention may be applied to a case where the engine has resumed the feedback control after mixture-leaning operation where the air-fuel ratio of the mixture is controlled to a leaner value than a theoretical value, e.g. when the engine rotational speed Ne is higher than a predetermined value and the intake pipe absolute pressure $P_{BA}$ is between lower and higher predetermined values, as disclosed, e.g. by U.S. Pat. No. 4,445,483 issued May 1, 1984, assigned to the same assignee as the present application.

Further, in the above embodiment, $O_2$ sensors are arranged in the exhaust pipe at locations upstream and downstream of the three-way catalyst 14, respectively. However, this is not limitative either, but the present invention may be applied to a system having a post-catalyst $O_2$ sensor alone.

What is claimed is:

1. A system for detecting deterioration of a three-way catalyst of an internal combustion engine having an intake passage, a throttle valve arranged in said intake passage, an exhaust passage, said three-way catalyst being arranged in said exhaust passage, and an air-fuel ratio sensor arranged in said exhaust passage at a location down-stream of said three-way catalyst for detecting the air-fuel ratio of an air-fuel mixture supplied to said engine, said system comprising:
  fuel supply control means for (i) starting to cut off the fuel supply to said engine when said engine is decelerated with said throttle valve substantially fully closed, and (ii) resuming the fuel supply to said engine when the rotational speed of said engine has become lower than a predetermined value;
  time-measuring means for measuring the time which the output from said air-fuel ratio sensor has required to reach a predetermined reference value after the resumption of the fuel supply to said engine by said fuel supply control means; and
  deterioration-determining means for determining that said three-way catalyst is deteriorated when said measured time is shorter than a predetermined time period.

2. A system according to claim 1, wherein said resumption of the fuel supply to said engine by said fuel supply control means comprises resuming feedback control in which the air-fuel ratio of a mixture supplied to said engine is controlled to a predetermined value in response to concentration of oxygen present in exhaust gases emitted from said engine.

3. A method according to claim 1, wherein said measuring of time which said output from said air-fuel ratio sensor has required to reach said predetermined reference value is carried out when a temperature of said engine is higher than a predetermined value.

4. A system according to claim 1, wherein said measuring of time which said output from said air-fuel ratio sensor has required to reach said predetermined reference value is carried out after a predetermined time period has elapsed after transition of said engine from starting mode to normal mode.

5. A system for detecting deterioration of a three-way catalyst of an internal combustion engine having an intake passage, a throttle valve arranged in said intake passage, an exhaust passage, said three-way catalyst being arranged in said exhaust passage, and an air-fuel ratio sensor arranged in said exhaust passage at a location downstream of said three-way catalyst for detecting the air-fuel ratio of an air-fuel mixture supplied to said engine, said system comprising:
  fuel supply control means for (i) starting to cut off the fuel supply to said engine when said engine is decelerated with said throttle valve substantially fully closed, and (ii) resuming the fuel supply to said engine when the rotational speed of said engine has become lower than a predetermined value;
  time-measuring means for measuring the time which the output from said air-fuel ratio sensor has required to reach a predetermined reference value after the resumption of the fuel supply to said engine by said fuel supply control means; and
  deterioration-determining means for determining that said three-way catalyst is deteriorated when said measured time is shorter than a predetermined time period,
    said deterioration-determining means including counting means for counting the number of times of determination of deterioration of said three-way catalyst, deterioration-determining means finally determining that said three-way catalyst is deteriorated when said counting means has counted a predetermined value.

6. A system for detecting deterioration of a three-way catalyst of an internal combustion engine having an intake passage, a throttle valve arranged in said intake passage, an exhaust passage, said three-way catalyst being arranged in said exhaust passage, and an air-fuel ratio sensor arranged in said exhaust passage at a location downstream of said three-way catalyst for detecting the air-fuel ratio of an air-fuel mixture supplied to said engine, said system comprising:

fuel supply control means for (i) starting to cut off the fuel supply to said engine when said engine is decelerated with said throttle valve substantially fully closed, and (ii) resuming the fuel supply to said engine when the rotational speed of said engine has become lower than a predetermined value, by resuming feedback control in which the air-fuel ratio of a mixture supplied to said engine is controlled to a predetermined value in response to the concentration of oxygen present in exhaust gases emitted from said engine, said feedback control being carried out by the use of a correction value set in response to said concentration of oxygen present in exhaust gases emitted from said engine;

time-measuring means for measuring the time which the output from said air-fuel ratio sensor has required to reach a predetermined reference value after the resumption of the fuel supply to said engine by said fuel supply control means, said measuring of time being carried out when said feedback control is resumed with said correction value set to a richer initial value; and deterioration-determining means for determining that said three-way catalyst is deteriorated when said measured time is shorter than a predetermined time period.

* * * * *